United States Patent
Chen et al.

(10) Patent No.: US 7,716,197 B2
(45) Date of Patent: May 11, 2010

(54) XCAP AND SIP FILTER CHAIN STATE TRANSFORMS VIA DYNAMIC HELPER FUNCTIONS FOR INTERNET MULTIMEDIA SUBSYSTEMS

(75) Inventors: Benson K. Chen, Durham, NC (US); Mark D. Gilmore, Durham, NC (US); Paul D. Lewis, Round Rock, TX (US); Scott M. Preddy, Austin, TX (US)

(73) Assignee: International Business Machines Corporation, Amronk, NY (US)

( * ) Notice: Subject to any disclaimer, the term of this patent is extended or adjusted under 35 U.S.C. 154(b) by 425 days.

(21) Appl. No.: 11/847,996

(22) Filed: Aug. 30, 2007

(65) Prior Publication Data

US 2009/0063539 A1 Mar. 5, 2009

(51) Int. Cl.
*G06F 7/00* (2006.01)
*G06F 17/00* (2006.01)
(52) U.S. Cl. .................................... 707/705; 707/802
(58) Field of Classification Search ........................ None
See application file for complete search history.

(56) References Cited

U.S. PATENT DOCUMENTS

2007/0088670 A1* 4/2007 Laurila ........................ 707/1
2007/0124294 A1* 5/2007 Sun et al. .................... 707/3
2008/0104124 A1* 5/2008 Bao et al. ................ 707/104.1

OTHER PUBLICATIONS

Prof. Dr. Thomas Magedanz, IPTComm Tutorial, Jul. 19, 2007, IMS vs. P2P and Web 2.0 (Understanding the Role of the IP Multimedia System (IMS) in face of a converging telco and internet service world).*

* cited by examiner

*Primary Examiner*—Pierre M Vital
*Assistant Examiner*—Loan T Nguyen
(74) *Attorney, Agent, or Firm*—Dillon & Yudell LLP

(57) ABSTRACT

The present invention extends a servlet filter chain model to include the ability to dynamically define helper functions. These dynamic helper functions modify the state of an XCAP or SIP request or response as it transitions through the filter chain. The dynamic helper functions are defined via descriptor files that are based on the document type. Each filter in the filter chain has the ability to reference and invoke the helper functions to modify the state of the request and/or response.

9 Claims, 3 Drawing Sheets

XCAP AND SIP FILTER CHAIN STATE TRANSFORMS VIA DYNAMIC HELPER FUNCTIONS FOR INTERNET MULTIMEDIA SUBSYSTEMS

BACKGROUND OF THE INVENTION

The present disclosure relates to the field of computers, and specifically to software. Still more specifically, the present disclosure relates to processing document requests.

The IBM WebSphere™ Extensible Markup Language (XML) Document Management Server (XDMS) is an implementation of the Open Mobile Alliance (OMA) XML Document Management (XDM) standards for storage, retrieval, and management of XML documents. The XDMS is used in a service plane of the Internet Protocol (IP) Multimedia Subsystems (IMS) for Service Providers in the Telecommunications industry to centrally store various types of documents used by their next generation applications. The previous product implementation of the XDMS was the IBM WebSphere™ Group List Server which implemented the OMA XDM standards, but was not flexible enough to accommodate the customer's need for injecting new code into the processing of XML Configuration Access Protocol (XCAP) or Session Initiation Protocol (SIP) requests.

BRIEF SUMMARY OF THE INVENTION

The present invention extends a J2EE Servlet filter chain model to include the ability to dynamically define helper functions. These dynamic helper functions modify the state of an XCAP or SIP request or response as it transitions through the filter chain. The dynamic helper functions and filters are defined via descriptor files that are based on the document type. Each filter in the filter chain has the ability to reference and invoke the helper functions to modify the state of the request and/or response, even if filter and helper functions are both defined for different document types.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
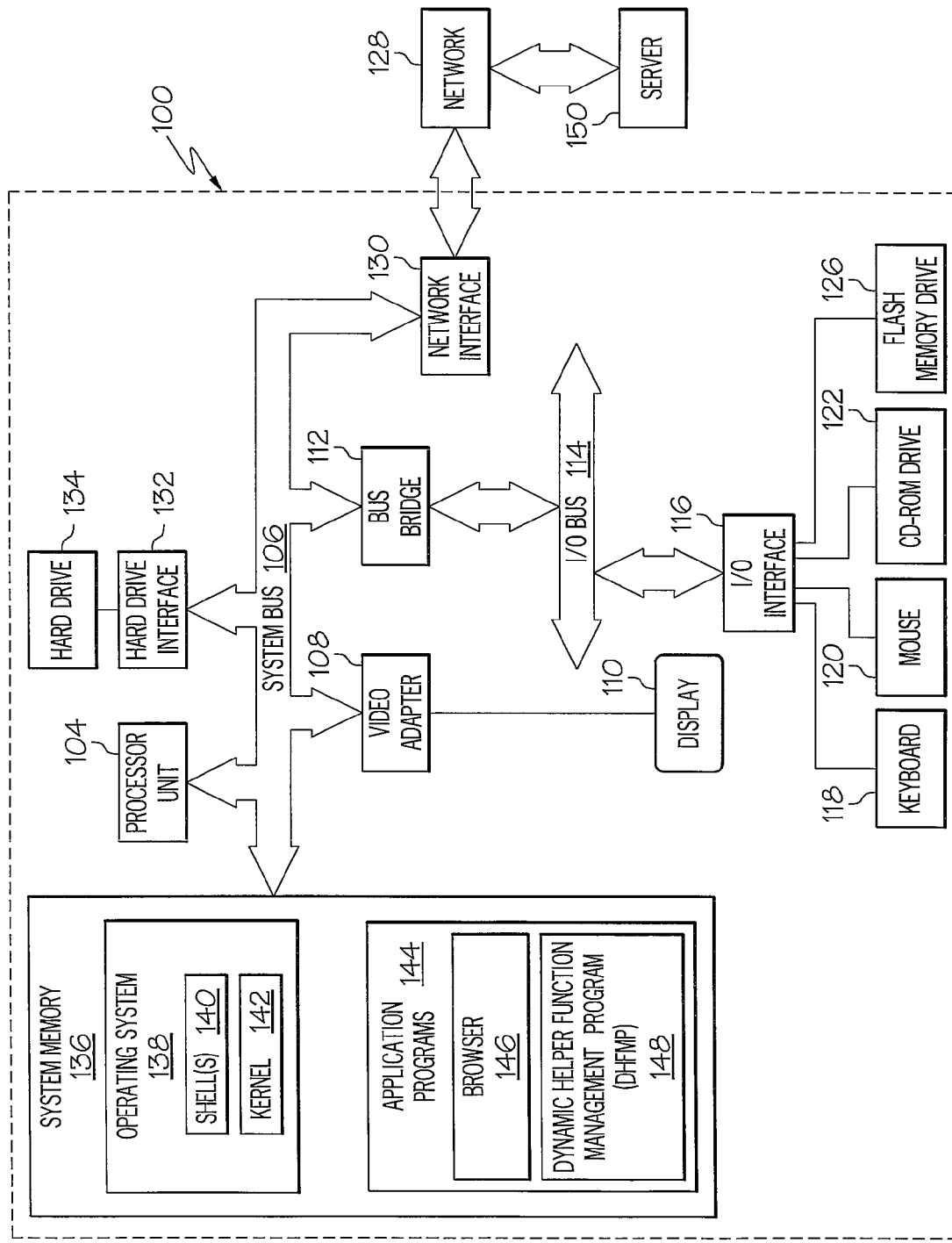
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Dynamic Helper Function Management Program (DHFMP) 148. DHFMP 148 performs the functions illustrated below in FIG. 2, and may include all logic, helper functions, databases and other resources depicted below in FIG. 3.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

As described in exemplary manner below, the present invention provides for a method for customizing an XML Configuration Access Protocol (XCAP) document requests flow by creating dynamic helper functions that help interact between multiple application usages (e.g., document types) within an XML Data Management Server (XDMS) system.

Figure 2:
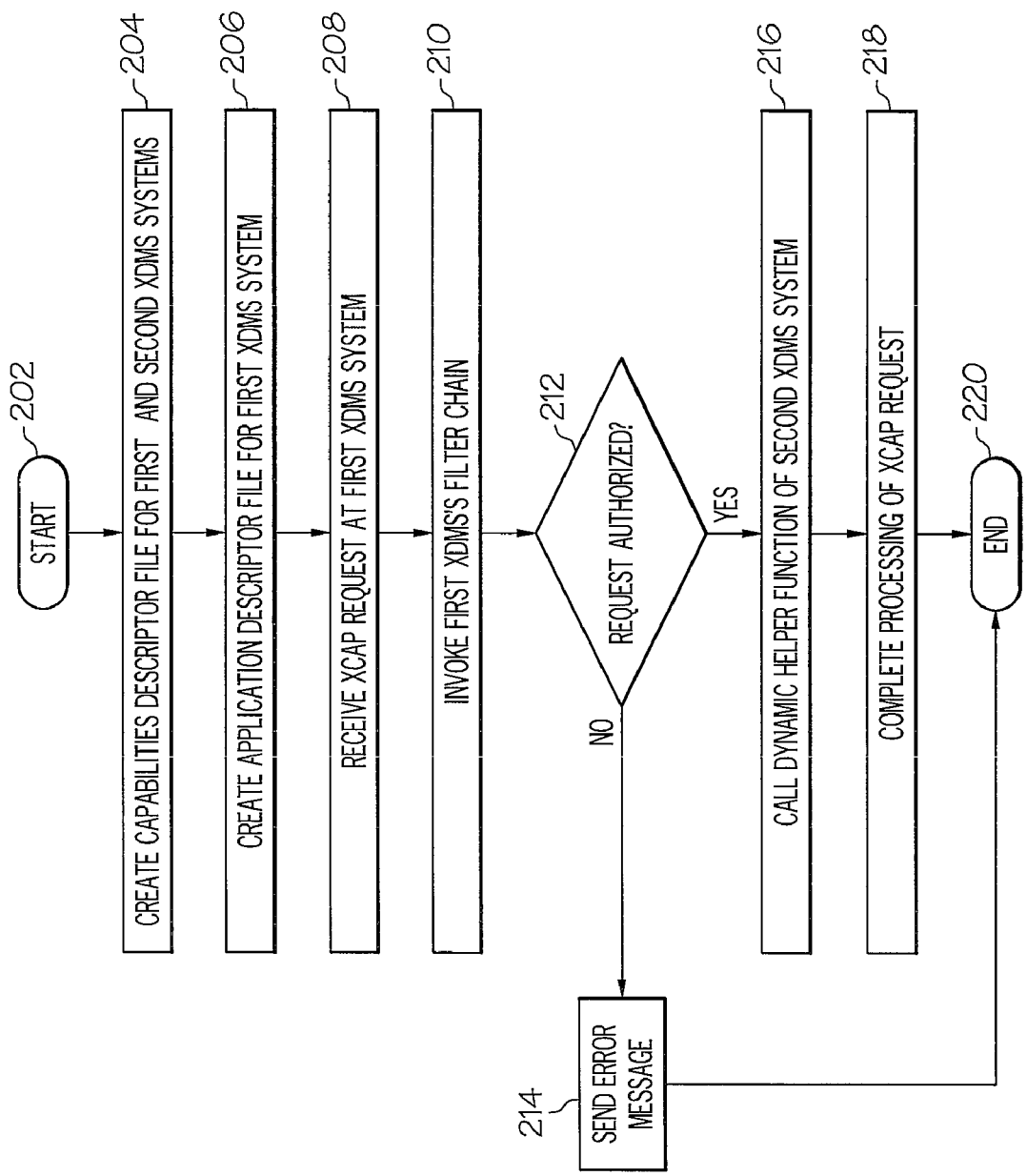
FIG. 2 is a high-level flow-chart of steps taken to utilize dynamic helper functions.

With reference now to FIG. 2, a high-level flow-chart showing the creation and use of dynamic helper functions for responding to an XCAP or SIP request is presented. After initiator block 202, which can be invoked at predeployment time, a capabilities descriptor file is created (block 204). This capabilities descriptor file describes which application usages a specific XDMS system supports. In addition, an application descriptor file is created for each application usage the XDMS will support (block 206). In an exemplary embodiment, the application descriptor file identifies and defines a usage sequence for an XCAP interface, an XML parser and schema validation logic, an authorization filter, an enabler constraint checking logic, an enabler special processing logic, and an XML data store filter. The application descriptor file also defines dynamic helper functions for a particular application usage. These defined dynamic helper functions are specifically tailored to support a first type of application, but are able to interact with other dynamic helper functions or filters for a second type of application, in order to fulfill the functionalities needed by the first type of application.

Figure 3:
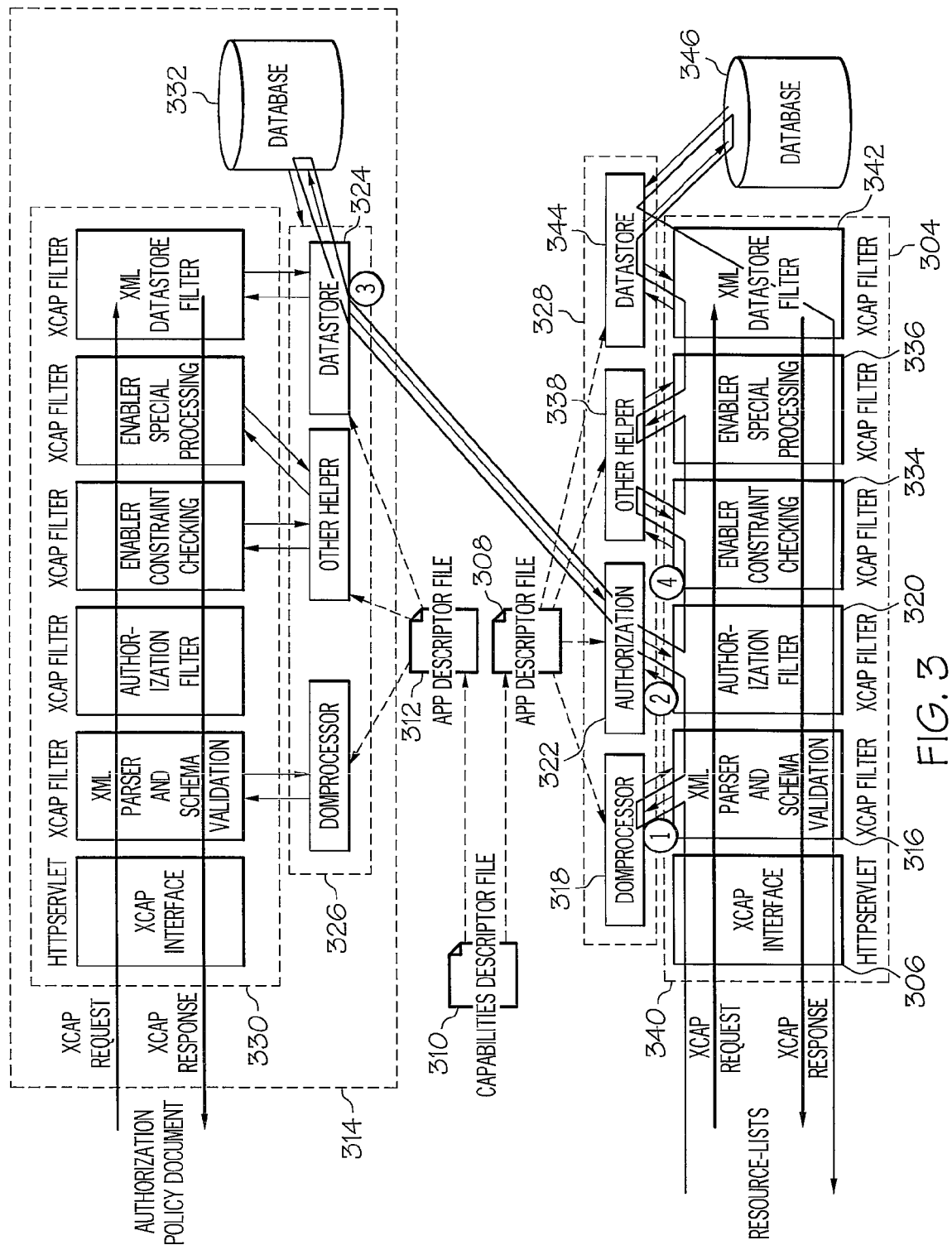
FIG. 3 illustrates exemplary steps taken to utilize dynamic helper functions when processing an XCAP request.

At run time, an XCAP request comes into a first XDMS system (block 208). The request may come in the format of any HyperText Transfer Protocol (HTTP) request command, including a "GET" command. Thus, using the GET format, the syntax of the XCAP request includes a Uniform Resource Locator (URL) that identifies the application usage (resource list) doing a GET for an existing document. That is, the XCAP URL identifies the type of document being requested, and where (in which URL-defined database) that document is located. Thus, when the first XDMS system recognizes that the XCAP request is for a document for a particular application usage that it supports, the XDMS system then starts the filter chain for this application usage. Appropriate filters are sequentially called to invoke methods therein, in accordance with the sequence defined in the application descriptor file for the type of document being requested. Each filter is able to call any helper function that filter needs. Note also that helper functions can then call other helper functions, as shown in FIG. 3, even for different application usages. One of these dynamic helper functions is an authorization helper function, which determines if the XCAP request is authorized (query block 212). An exemplary process for determining such authorization in the present invention is as follows. First (e.g., as marked by circle "1" in FIG. 3), a request comes into an Authorization XCAP filter on the first XDMS. Second (see circle "2" in FIG. 3), the Authorization XCAP filter gets Authorization helper function to determine if the requestor is authorized. Third (see circle "3" in FIG. 3), the Authorization helper function retrieves the Datastore helper function from the second XDMS (i.e., the second XDMS manages authorization policy documents). The Authorization helper function uses the Datastore helper function to retrieve authorization policies. Fourth (see circle "4" in FIG. 3), the Authorization helper function determines if the user is authorized or not, and returns the result back to the Authorization XCAP filter.

If the XCAP request is unauthorized (e.g., is from an unauthorized user, computer, URL location, etc.), then an error message is generated (block 214) for transmission to a party that is managing the first XDMS system (as well as the XCAP request sender). If the XCAP request is authorized, then dynamic helper functions are called from a second XDMS system (block 216). These second XDMS dynamic helper functions are directly implemented and enabled by the second XDMS system, but are utilized by the first XDMS system. Using the second XDMS's dynamic helper functions, the first XDMS system completes processing of the XCAP request (block 218), and the process ends (terminator block 220).

Referring now to FIG. 3, an exemplary procedure and system for handling an XCAP request for an XML document (i.e., a resource-lists XCAP request) is illustrated. Assume that a resource-lists XCAP request is received by a first XDMS system 302. The resource-lists XCAP request may be for an XML document used to update an existing resource-list document. The first XDMS system 302 includes a first set of resources 304, which comprises an XCAP interface 306. XCAP interface is an HTTP servlet that constructs a filter chain for the first set of resources 304 based on the resource-lists document type and first application descriptor file 308, and thus invokes each filter in the first set of resources 304 in proper order. Note that the first application descriptor file 308 is further defined by a capabilities descriptor file 310, which identifies what application usage (or other XML document type) is supported by first application descriptor file 308 and a second application descriptor file 312 (which is dedicated to a second XDMS system 314). When the resource-lists XCAP request comes in to the first XDMS system 302, the XML parser and schema validation logic filter 316 calls a Document Object Model (DOM) processor helper function 318, which parses the resource-lists XCAP request from native XML into a Java-friendly DOM document. The DOM document (Java-formatted resource-lists XCAP request) is then sent to an authorization filter 320, which calls an authorization helper function 322. The authorization helper function 322 is able to call a datastore helper function 324 in the second XDMS system 314.

Note that the datastore helper function 324 is part of a second set of dynamic helper functions 326 found in second XDMS system 314, just as DOM processor helper function 318 and authorization helper function 322 are part of a first set of dynamic helper functions 328 found in the first XDMS system 302. As such, datastore helper function 324 is enabled by an authorization policy document that has been processed by the second XDMS system 314 (using the second set of dynamic helper functions 326 and a second set of resources 330). The second XDMS system 314 processes the authorization policy document XCAP request in a manner that is analogous to that described for the first XDMS system 302 processing the resource-lists XCAP request. Thus, when the call comes in from the authorization helper function 322, the authorization helper function 322 calls the Datastore helper function 324 to retrieve the authorization policies. The authorization helper function 322 determines if the user is authorized to use the authorization policies received from the Datastore helper function 324. Note that the name of the sender (or other authorization information) is gleaned from XML header information found in the incoming resource-lists XCAP request.

Once the first XDMS system 302 approves (authorizes) the request sender, the DOM document proceeds to an enabler constraint checking logic filter 334, which verifies that the document being requested is valid (e.g., in the proper naming format). The DOM document proceeds further to an enabler special processing logic filter 336, which is any custom-created logic by the owner of the first XDMS system 302. Note that the enabler constraint checking logic filter 334 and the enabler special processing logic filter 336 both utilize the same other helper function 338, which is any customized helper function that is needed by one or more of the resources in the first set of resources 340.

The DOM document then proceeds to an XML data store filter logic 342, which calls a datastore logic helper function 344. The datastore logic helper function 344 is able to retrieve the requested document from a database 346. The retrieved document is then returned to the sender of the resource-lists XCAP request.

Note that the examples described in FIG. 2 and FIG. 3 contemplate an XCAP request. However, the present invention is not to be construed as being limited to only XCAP requests. For example, the same method and logic described can also handle a Session Initiation Protocol (SIP) request by switching out the XCAP interfaces shown in FIG. 3 with analogous SIP interfaces.

As described herein, the present invention extends a servlet filter chain model to include the ability to dynamically define helper functions. These dynamic helper functions modify the state of an XCAP or SIP request or response as it transitions through the filter chain. The dynamic helper functions are defined via descriptor files that are based on the document type. Each filter in the filter chain has the ability to reference and invoke the helper functions to modify the state of the request and/or response, even if the helper function is for another application usage.

The dynamic helper functions described herein presents many advantages over the prior art. Unlike the prior art, the dynamic helper functions 1) are easily configured into an XDMS environment; 2) separate out common functions useful across all filters; 3) are easily accessible to each filter to invoke; and 4) permit filters for one document type (application usage) may also utilize helper functions for another document type, thus allowing filters to introspect other configured document types' documents. These combined features are not available in the prior art. Furthermore, their combination meets a long felt need for flexibility in retrieving XML documents, which need has not been met before the present invention.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for processing a document request, the method comprising:

creating a capabilities descriptor file for a first Extensible Markup Language Document Management System (XDMS) and a second XDMS, wherein the capabilities descriptor file describes which application usages are supported by each of the first and second XDMSes;

creating a first application descriptor file for the first XDMS;

creating a second application descriptor file for the second XDMS, wherein the first application descriptor file and the second application descriptor file each identifies and defines an order of use sequence for separate resources that each comprise an Extensible Markup Language (XML) Configuration Access Protocol (XCAP) interface, an XML parser and schema validation logic, an authorization filter, an enabler constraint checking logic, an enabler special processing logic, and an XML data store filter, and wherein the first application descriptor file also defines a first set of dynamic helper functions for a first type of application usage that is supported by the first XDMS, wherein the first set of dynamic helper functions is specifically tailored to support the first type of application and comprises a first Document Object Model (DOM) processor helper function, a first authorization helper function, a first other helper function, and a first datastore helper function, and wherein the second application descriptor file also defines a second set of dynamic helper functions for a second type of application usage that is supported by the second XDMS, wherein the second set of dynamic helper functions is specifically tailored to support the second type of application and comprises a second DOM processor helper function, a second other helper function, and a second datastore helper function, and wherein at least one dynamic helper function, from the first set of dynamic helper functions, interacts with at least one dynamic helper function from the second set of dynamic helper functions;

receiving an XCAP request to the first XDMS system, wherein the XCAP request follows a syntax that includes a Uniform Resource Locator (URL) that identifies and locates a resource list that contains a document being requested by the XCAP request;

invoking the first set of dynamic helper functions from the first set of dynamic helper functions to invoke methods therein in accordance with the sequence defined in the application descriptor file for a type of document being requested by the XCAP request;

calling at least one dynamic helper function from the second set of dynamic helper functions, wherein the first XDMS calls the at least one dynamic helper function from the second set of dynamic helper functions that are supported by the second XDMS; and utilizing a called second XDMS dynamic helper function to complete processing of the XCAP request by the first XDMS.

2. The method of claim 1, wherein first XDMS receives and executes the XCAP request, and wherein the second XDMS authorizes the XCAP request.

3. The method of claim 1, wherein the first helper function is defined by a first owner of the first XDMS, and wherein the second helper function is defined by a second owner of the second XDMS.

4. A computer program product having a plurality of computer usable program codes stored on a computer useable storage medium that, when read and executed by a computer, causes the computer to perform a method for processing a document request, the computer program product comprising:

computer usable program code configured for creating a capabilities descriptor file for a first Extensible Markup Language Document Management System (XDMS) and a second XDMS, wherein the capabilities descriptor file describes which application usages are supported by each of the first and second XDMSes;

computer usable program code configured for creating a first application descriptor file for the first XDMS;

computer usable program code configured for creating a second application descriptor file for the second XDMS, wherein the first application descriptor file and the second application descriptor file each identifies and defines an order of use sequence for resources that comprise an Extensible Markup Language (XML) Configuration Access Protocol (XCAP) interface, an XML parser and schema validation logic, an authorization filter, an enabler constraint checking logic, an enabler special processing logic, and an XML data store filter, and wherein the first application descriptor file also defines a first set of dynamic helper functions for a first type of application usage that is supported by the first XDMS, wherein the first set of dynamic helper functions is specifically tailored to support the first type of application and comprises a first Document Object Model (DOM) processor helper function, a first authorization helper function, a first other helper function, and a first datastore helper function, and wherein the second application descriptor file also defines a second set of dynamic helper functions for a second type of application usage that is supported by the second XDMS, wherein the second set of dynamic helper functions is specifically tailored to support the second type of application and comprises a second DOM processor helper function, a second other helper function, and a second datastore helper function, and wherein at least one dynamic helper function, from the first set of dynamic helper functions, interacts with at least one dynamic helper function from the second set of dynamic helper functions;

computer usable program code configured for receiving an XCAP request to the first XDMS system, wherein the XCAP request follows a syntax that includes a Uniform Resource Locator (URL) that identifies and locates a resource list that contains a document being requested by the XCAP request;

computer usable program code configured for invoking the first set of dynamic helper functions from the first set of dynamic helper functions to invoke methods therein in accordance with the sequence defined in the application descriptor file for a type of document being requested by the XCAP request;

computer usable program code configured for calling at least one dynamic helper function from the second set of dynamic helper functions, wherein the first XDMS calls the at least one dynamic helper function from the second set of dynamic helper functions that are supported by the second XDMS; and computer usable program code configured for utilizing a called second XDMS dynamic helper function to complete processing of the XCAP request by the first XDMS.

5. The computer program product of claim 4, wherein first XDMS receives and executes the XCAP request, and wherein the second XDMS authorizes the XCAP request.

6. The computer program product of claim 4, wherein the first helper function is defined by a first owner of the first XDMS, and wherein the second helper function is defined by a second owner of the second XDMS.

7. A method for processing a document request, the method comprising:

creating a capabilities descriptor file for a first Extensible Markup Language Document Management System (XDMS) and a second XDMS, wherein the capabilities descriptor file describes which application usages are supported by each of the first and second XDMSes;

creating a first application descriptor file for the first XDMS;

creating a second application descriptor file for the second XDMS, wherein the first application descriptor file and the second application descriptor file each identifies and defines an order of use sequence for resources that comprise a Session Initiation Protocol (SIP) interface, an XML parser and schema validation logic, an authorization filter, an enabler constraint checking logic, an enabler special processing logic, and an XML data store filter, and wherein the first application descriptor file also defines a first set of dynamic helper functions for a first type of application usage that is supported by the first XDMS, wherein the first set of dynamic helper functions is specifically tailored to support the first type of application and comprises a first Document Object Model (DOM) processor helper function, a first authorization helper function, a first other helper function, and a first datastore helper function, and wherein the second application descriptor file also defines a second set of dynamic helper functions for a second type of application usage that is supported by the second XDMS, wherein the second set of dynamic helper functions is specifically tailored to support the second type of application and comprises a second DOM processor helper function, a second other helper function, and a second datastore helper function, and wherein at least one dynamic helper function, from the first set of dynamic helper functions, interacts with at least one dynamic helper function from the second set of dynamic helper functions;

receiving an SIP request to the first XDMS system, wherein the SIP request follows a syntax that includes a Uniform Resource Locator (URL) that identifies and locates a resource list that contains a document being requested by the SIP request;

invoking the first set of dynamic helper functions from the first set of dynamic helper functions to invoke methods therein in accordance with the sequence defined in the application descriptor file for a type of document being requested by the SIP request;

calling at least one dynamic helper function from the second set of dynamic helper functions, wherein the first XDMS calls the at least one dynamic helper function from the second set of dynamic helper functions that are supported by the second XDMS; and utilizing a called second XDMS dynamic helper function to complete processing of the XCAP request by the first XDMS.

8. The method of claim 7, wherein first XDMS receives and executes the SIP request, and wherein the second XDMS authorizes the SIP request.

9. The method of claim 7, wherein the first helper function is defined by a first owner of the first XDMS, and wherein the second helper function is defined by a second owner of the second XDMS.

* * * * *